United States Patent [19]

Payton et al.

[11] 4,364,411
[45] Dec. 21, 1982

[54] LIQUID LINE THERMAL BARRIER

[76] Inventors: Kenneth J. Payton, 9251 NE. 178th; Jay O. Payton, 21909-49th Ave. SE., both of, Bothell, Wash. 98011

[21] Appl. No.: 170,792

[22] Filed: Jul. 21, 1980

[51] Int. Cl.³ .............................................. F16K 49/00
[52] U.S. Cl. ................................................. 137/513.5
[58] Field of Search ................. 137/540, 513.3, 513.5, 137/513.7; 251/368

[56] References Cited

U.S. PATENT DOCUMENTS

| | | | |
|---|---|---|---|
| 3,190,284 | 6/1965 | Koepf | 137/513.5 |
| 3,412,756 | 11/1968 | Shore | 137/540 |
| 3,438,391 | 4/1969 | Yocum | 137/540 |
| 3,550,902 | 12/1970 | Pidgeon et al. | 251/368 X |
| 3,756,273 | 9/1973 | Hengesbach | 137/540 |
| 3,920,042 | 11/1975 | Blatt | 137/513.5 X |
| 3,943,969 | 3/1976 | Rubin et al. | 137/540 X |
| 4,149,560 | 4/1979 | Berg | 137/351 X |

Primary Examiner—Alan Cohan
Assistant Examiner—John A. Rivell
Attorney, Agent, or Firm—Robert W. Beach; Douglas E. Winters; Ward Brown

[57] ABSTRACT

Heat conduction along and through the line of a nonambient temperature liquid system is deterred by a thermal barrier having insulative stop and seat components interengaged for thermally isolating the liquid on one side of the barrier from the liquid on the other side of the barrier when the liquid within the line is stagnant. The barrier automatically opens to permit liquid flow through the line and closes to thermally isolate the liquid when the flow is interrupted, i.e. the liquid flow within the line is substantially unimpeded by the thermal barrier. For an application in which the line is subjected to low temperature which could freeze trapped liquid, such as in the outlet line of a water heater located in an uninsulated space, a small bypass passage is provided which is open when the barrier stop is closed so that a limited amount of heat is conducted past the barrier to deter freezing of the water.

3 Claims, 3 Drawing Figures

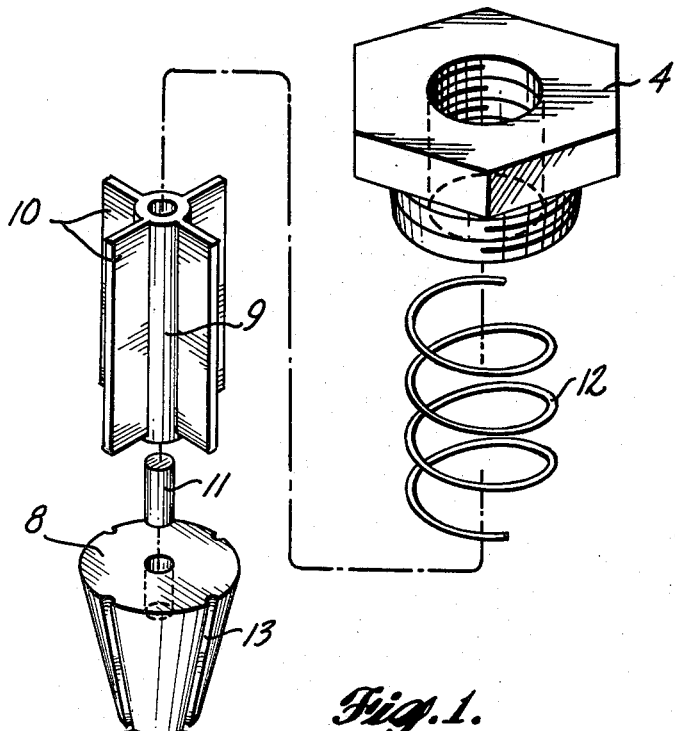
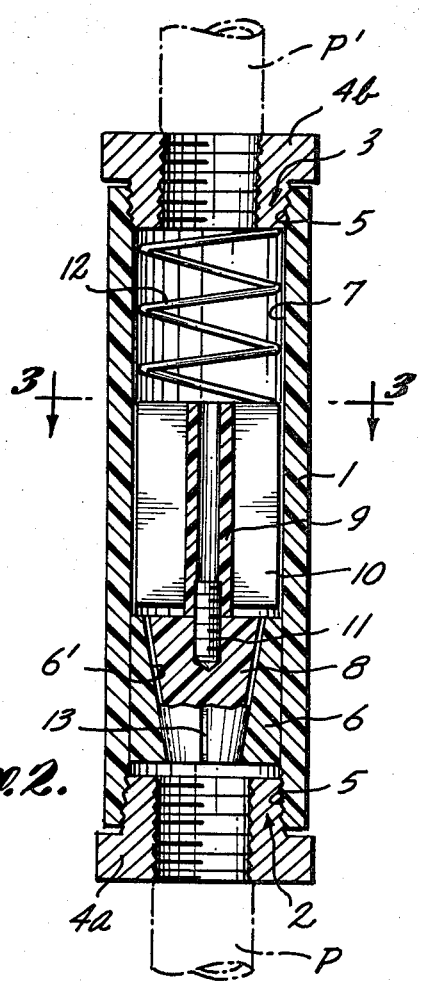
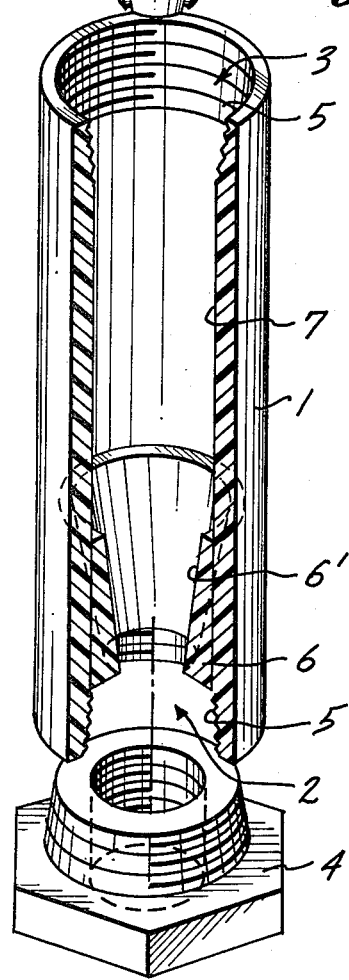
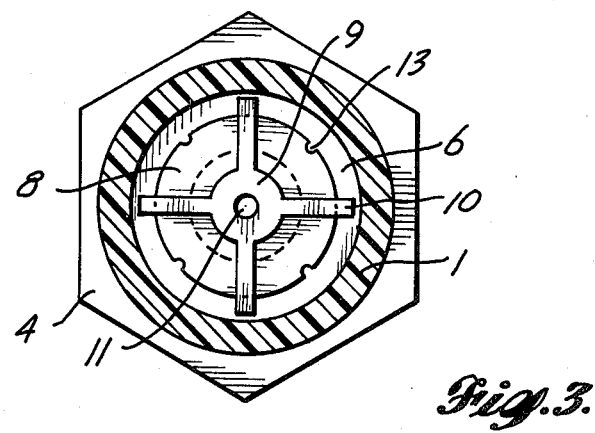
Fig. 1.
Fig. 2.
Fig. 3.

LIQUID LINE THERMAL BARRIER

BACKGROUND OF THE INVENTION

Field of the Invention

The present invention relates to a liquid handling system intermittently actuated for flow of nonambient temperature liquid through a line, and, more particularly, to a thermal barrier for deterring heat conduction along and through the line when liquid is not flowing through the line.

SUMMARY OF THE INVENTION

It is an object of the present invention to provide a mechanism for deterring conduction of heat along and through the line of a nonambient temperature liquid system actuated intermittently for flow of liquid through the line.

A further object is to deter the conduction of heat along the line without impeding liquid flow through the line.

A still further object is to provide such mechanism in a form allowing a limited amount of heat conduction through the mechanism to deter freezing of the liquid in the line.

Another object is to provide such mechanism in uncomplicated and inexpensive form and which is quickly and easily installable in the line.

The foregoing objects can be accomplished by installing in the line a one-way valve-like obstruction or barrier constructed of thermal insulating material. In the preferred embodiment of the invention, the barrier resembles a straightway, lift-type, check valve in which the interfitting components are constructed of plastic such as Teflon for normally preventing heat conduction through the line itself or through liquid in the line. The body of the barrier forms an insert or connection that can be installed easily in the line, and is constructed of thermal insulating material to deter heat conduction through the body of the thermal barrier. Freezing of liquid on the cold side of the barrier is deterred by including a bypass of comparatively small dimension past the interfitting, line-obstructing components in closed position, thereby enabling a limited amount of heat conduction past the barrier.

Prior Art

Valve parts constructed of plastic are disclosed in U.S. Pat. No. 3,756,273 to Hengesbach, U.S. Pat. No. 3,438,391 to Yocum and U.S. Pat. No. 4,149,560 to Berg. Hengesbach states that preferably the surfaces of a valve sealing wall and plug are coated with Teflon because of its lubricating effect and its resistance to corrosion and adherence of foreign matter, so that better seating of the plug is assured. Yocum suggests that valve components be constructed of polymers such as Teflon and nylon because of their lubricity and cold flow properties. Berg suggests the use of a metal or plastic valve body, but gives no reason for such a choice of materials. None of such patents teaches the provision of a thermal barrier made of plastic material.

BRIEF DESCRIPTION OF THE DRAWINGS

FIG. 1 is an exploded top perspective of the thermal barrier of the present invention, parts being broken away.

FIG. 2 is an axial section through the thermal barrier of the present invention in assembled condition.

FIG. 3 is a transverse section taken along line 3—3 in FIG. 2.

DETAILED DESCRIPTION

Significant heat is conducted through the lines of a liquid system including nonambient temperature in them, particularly if the liquid flows through the lines only intermittently. A line-obstructing thermal barrier in accordance with the present invention has a wide range of applications in such systems in which there is unidirectional flow of liquid to minimize heat transfer through the barrier when the liquid is not flowing.

One practical application of such a barrier is in the metal outlet pipe from a domestic water heater supplying hot water in a family dwelling. The demand for hot water from a hot water heater is intermittent so that the water within the pipe may be stagnant for long periods, such as at night, while the pipe is subjected to low ambient temperature. During such periods, heat is conducted from the water heater through water in the outlet pipe and dissipated through the metal wall of the pipe. By installing a thermal barrier in accordance with the present invention in the outlet pipe adjacent to the water heater, the loss of heat by conduction through the water and pipe is minimized, yet since the water flows in only one direction flow of hot water on demand is not impeded.

As shown in FIGS. 1 and 2, the generally cylindrical body 1 of the thermal barrier of the present invention has an internally threaded inlet 2 and an internally threaded outlet 3 into which conventional reducer bushings 4a and 4b are screwed. The interior pipe threads 5 of the barrier body enable easy installation of the barrier by connection to the outlet pipe of a water heater as indicated in FIG. 2. By using opposite hand threads, for example left hand threads in the inlet bushing 4a and the body inlet and right hand threads in the outlet bushing 4b and the body outlet, the barrier can be installed in an existing hot water system by cutting the hot water pipe adjacent to the water heater, attaching the bushings to the severed ends P and P' of the pipe, and then screwing both bushings into the body simultaneously by rotating the body.

A seat 6 housing a concave frustoconical bore surface 6' is formed in or press-fitted into the interior of the barrier body and forms an integral part of the body. From its inlet 2 the barrier body bore flares in the direction of liquid flow opening into an elongated cylindrical chamber 7. The inlet side of a separate frustoconical stop 8 received in such chamber includes a convex frustoconical surface which is complemental to and engageable with the seat. Such stop is movable axially of the barrier body from its normal, line-obstructing position shown in FIG. 2, in which the inlet side of the stop is in substantially contiguous engagement with the seat bore 6', to a line-opening position displaced toward the outlet end 3 of the barrier body permitting liquid flow between the complemental surfaces of the stop and its seat bore.

A guide 9 connected to the outlet end of the stop 8 by an attaching stud 11 is reciprocable with the stop in chamber 7. Such guide has radial fins 10 slidable along the inner periphery of the chamber to maintain the interfitting surfaces of the stop and the seat in proper alignment as the stop is moved between its open and closed positions. A helical compression spring 12 engaged between the outlet end of the guide and the outlet bushing 4b exerts a closing force of one-half to three pounds (2.2 to 13.3 newtons) on the stop 8, which is enough to ensure seating of the stop when all of the faucets of the hot water system are shut, yet weak enough that the stop is moved to its open position by flow through the pipe when a faucet is opened appreciably.

The body 1 and stop 8 are constructed of Teflon i.e. tetrafluoroethylene, polycarbonate, CPVC i.e. polyvinyl dichloride or other thermal insulating material and form a thermal barrier when the stop is closed. The thermal conductivity of the above listed materials is set forth in Table I.

TABLE I

|  | Btu/(hr)(ft$^2$) (°F./ft) | Cal/(sec)(cm$^2$) (°C./cm) |
|---|---|---|
| Tetrafluoroethylene[1],[2] | .14 | .00060 |
| Polycarbonate[1],[2] | .11 | .00046 |
| Polyvinyl dichloride[3] | .08 | .00033 |

[1] Simonds, H. R. A Concise Guide to Plastics. N.Y., Reinhold Book Corporation, 1963. pp. 10, 50.
[2] Perry, J. H. Chemical Engineers' Handbook. 4th ed. N.Y., McGraw-Hill Book Company, 1963. p. 23-54.
[3] Lynch, C. T. CRC Handbook of Materials Science. Vol III, Cleveland, CRC Press, 1975, p.14.

Thermal conductivity having units of Btu/(hr)(ft$^2$)(°F./ft) is a measure of the amount of heat that passes through a unit area of a substance of unit thickness in a unit of time when the opposite faces of the unit area differ by one degree. For example, if a substance has a thermal conductivity of 0.14 Btu/(hr)(ft$^2$)(°F./ft), 0.14 Btu's of heat will pass through a slab of the material one square foot in cross section and one foot thick in one hour when the temperature difference between the one square foot surfaces is one degree Fahrenheit. When a hot water faucet is opened, the pressure downstream of the barrier decreases until the pressure differential across the stop 8 exceeds the force of spring 12, whereupon the stop is forced off the seat 6 by the pressure of the water at the inlet side of the seat and water flows from the water heater through the barrier body. When the faucet is shut, the pressure differential across the stop decreases and the compression spring forces the stop back into engagement with the seat bore 6′, thermally isolating the water heater from the water and pipe downstream from the barrier. During periods when the water downstream from the thermal barrier is stagnant, heat from such water is conducted through the metal wall of pipe P′ until the temperature of such water approaches ambient temperature. Heat loss from the water heater is reduced and energy is conserved because the stagnant water downstream from the barrier does not continue to be warmed by heat conduction through the pipe itself or through stagnant water in the pipe.

In extremely cold climate, if the water downstream from the thermal barrier were completely thermally isolated from the water heater, the risk of the downstream water freezing and bursting the pipe would be great. Accordingly, the stop 8 may have elongated longitudinal grooves or ducts 13 in its surface of semicircular cross section as shown in FIGS. 1, 2 and 3 to permit a small amount of heat to be conducted through the barrier by the water in it to deter freezing of stagnant downstream water. As shown in FIG. 2, the radius of each of the four semicircular grooves is approximately one sixth the radius of the valve-controlled liquid duct at its narrowest point adjacent to the base of the seat 6. Each duct would therefore have a cross-sectional area of one-seventy second of the smallest cross section of the liquid duct. The combined cross section of the four grooves or duct means is approximately one eighteenth of the cross section of the liquid duct. Since the grooves have a length a multiplicity of times their width, as shown in FIGS. 1 and 2, only a limited amount of heat can be conducted across the stop when the stop is in engagement with the seat. Optionally, the seat bore 6′ may be grooved instead of the stop, or the seat 6 may be apertured to bypass the engaged stop and seat bore. An additional advantage of the bypass is that the pressure across the stop will equalize when the faucets are shut and prevent valve chatter even if one or more of the faucets leak slightly.

We claim:

1. A thermal barrier comprising a hollow body forming a liquid duct having a liquid inlet and a liquid outlet and having a seat between said liquid inlet and said liquid outlet; a stop engageable with said seat to obstruct said duct, said stop being of substantial extent lengthwise of said duct and engageable with said seat over a considerable area and said body and said stop being constructed of thermal insulating plastic material having such a low thermal conductivity that when said stop is in engagement with said seat a substantial extent of such material is interposed between said liquid inlet and said liquid outlet so that said liquid inlet is thereby substantially thermally isolated from said liquid outlet; and small elongated duct means having a length a multiplicity of times its width bypassing said stop so that liquid within said elongated duct means can conduct a limited amount of heat across said stop when said stop is in engagement with said seat, said stop being biased into engagement with said seat and responsive to pressure on the inlet side thereof to open it, said stop including a frustoconical surface, said seat including a frustoconical surface tapered lengthwise of said duct and complemental to said frustoconical surface of said stop which surfaces abut when said stop is in engagement with said seat.

2. The barrier defined in claim 1, in which the thermal insulating material has a thermal conductivity of no greater than about 0.2 Btu/(hr)(ft$^2$)(°F./ft), i.e. 0.00083 Cal/(sec)(cm$^2$)(°C./cm).

3. The barrier defined in claim 1, in which the duct means has a cross section not appreciably greater than one-eighteenth of the minimum cross section of the liquid duct.

* * * * *

UNITED STATES PATENT AND TRADEMARK OFFICE
CERTIFICATE OF CORRECTION

PATENT NO. : 4,364,411
DATED : December 21, 1982
INVENTOR(S) : Kenneth J. Payton and Jay O. Payton It is certified that error appears in the above-identified patent and that said Letters Patent are hereby corrected as shown below:

Title page, [76] Inventors, after "Kenneth J. Payton," cancel "9251 NE. 178th" and insert ---21909 - 49th Ave. SE---.

Signed and Sealed this

Twenty-ninth Day of March 1983

[SEAL]

Attest:

GERALD J. MOSSINGHOFF

Attesting Officer

Commissioner of Patents and Trademarks